United States Patent [19]
Wheeler

[11] Patent Number: 5,058,368
[45] Date of Patent: Oct. 22, 1991

[54] HARVESTING OF DELICATE PRODUCE

[76] Inventor: Geoffrey C. Wheeler, Brook Vale, Trolver Hill, Penpol, Feock, Truro, England

[21] Appl. No.: 608,213

[22] Filed: Nov. 2, 1990

[30] Foreign Application Priority Data

Nov. 3, 1989 [GB] United Kingdom ............... 8924798

[51] Int. Cl.⁵ .......................................... A01D 45/00
[52] U.S. Cl. .................................... 56/13.1; 56/327.1
[58] Field of Search ...................... 56/12.8, 12.9, 13.1, 56/10.8, DIG. 9, 327.1

[56] References Cited

U.S. PATENT DOCUMENTS

| | | | |
|---|---|---|---|
| 3,635,005 | 1/1972 | Persson | 56/327.1 |
| 4,344,275 | 8/1982 | Kateman | 56/327.1 |
| 4,545,186 | 10/1985 | MacCanna | 56/13.1 |

Primary Examiner—Thuy M. Bui
Attorney, Agent, or Firm—Weingram & Zall

[57] ABSTRACT

Apparatus for harvesting delicate produce—but particularly mushrooms—includes a picking head which is controlled to be positioned over an item of produce to be harvested, by a camera which scans a tray of said items and a control unit operating on a camera output to determine the co-ordinates of those items found to be suitable for picking, for example from the size of those items. The picking head includes a bellows-like produce gripper through which air is drawn to hold an item of produce securely but gently against an engagement face at the free end of the gripper. Once the item has been securely held, it is pulled free by twisting and lifting action, imparted to the picking head. The stalk is then cut away by a cutter, and the item is deposited in a box carried on a separate conveyer.

14 Claims, 4 Drawing Sheets 5,058,368

HARVESTING OF DELICATE PRODUCE

BACKGROUND TO THE INVENTION (i) Field of the Invention

This invention relates to methods of an apparatus for the harvesting of produce. The invention is particularly—though not exclusively—applicable to the harvesting of produce of a delicate character such as soft fruit or vegetables and which might easily be bruised or damaged by an automated harvesting procedure. In its preferred forms, the invention is especially applicable to the harvesting of mushrooms.

(ii) Description of the Prior Art

The harvesting of many kinds of fruits and vegetables is most often performed manually. A human operator can with experience rapidly determine whether any particular item of produce is ready for harvesting and, in the case of delicate fruits and vegetables, the likelihood of damage can be minimised. The costs of harvesting produce can represent a significant proportion of the ultimate retail price of the produce, though since harvesting is often considered to be low-level poorly-paid work of a seasonal character, it can be difficult for growers to obtain sufficient staff at the required times.

In view of the above difficulties, attempts have been made to automate the harvesting of various kinds of produce, but so far these have met with only limited success, especially in the case of the harvesting of delicate produce such as mushrooms. The capital cost of the equipment tends to be very high and yet the productivity relatively low, particularly if the produce requires delicate handling.

OBJECTS OF THE INVENTION

It is a principal object of the present invention to provide a method of harvesting delicate produce, as well as apparatus for performing such a method, which is able to overcome the disadvantages mentioned above. More specifically, it is an object of the invention to provide a method of harvesting produce which may be performed on an automatic basis, without causing significant damage to the produce.

A further object is to provide an automatic harvesting method for mushrooms, which will not cause damage to the mycelium in the growing medium.

Yet another object is to provide an automatic harvesting method for delicate produce, which may be performed rapidly by utilising a video camera to produce an image of the growing site, and then analysing the image to obtain the co-ordinates of the produce to be harvested.

A further object of this invention is to provide apparatus able automatically to harvest produce of a delicate nature, at a rapid rate without causing significant damage to that produce.

Yet another object is to provide apparatus which is arranged to harvest an item of delicate produce by gripping that item, and then twisting the item and essentially simultaneously pulling the item away from the growing site.

SUMMARY OF THE INVENTION

In accordance with the foregoing and other objects, a first aspect of the present invention provides a method of harvesting produce in which a growing area for the produce is scanned with a video camera, to yield an image of that area and the resultant image is analysed to determine the co-ordinates relative to a pre-set datum of each item of produce assessed to be suitable for harvesting on the basis of a characteristic analysed from said image, such as the size of each item. A harvesting head including a suction gripper for holding an item of produce is controlled to a position over the growing area with its line of action intersecting the co-ordinates of an item of produce selected for harvesting, and the harvesting head is moved towards the item until the gripper makes contact with and holds by suction the item of produce. Then, by twisting the gripper whilst maintaining the hold of the gripper on the item, and substantially simultaneously moving the harvesting head away from the engagement position, said item is picked from the growing site, whereafter the harvesting head is moved to a discharge position and the item is released by removing the suction from the gripper.

It will be appreciated that in the present invention, a video camera is used to derive an image of a growing area (for example, a growing tray for mushrooms). The image is then analysed to determine which items of produce should be harvested (for example, mushrooms of a size falling within a preset range of diameters) and the co-ordinates of those items are determined, relative to some datum. Next, a harvesting head having a suction gripper for the produce is used to grip the item, whereafter the item is harvested by pulling the item away from the growing area whilst at essentially the same time imparting thereto a twisting motion. The harvesting head may then carry the item to a convenient point for its discharge, for example into a box. The use of a video camera to produce an image which conveniently is analysed by a computer running a suitable program allows the method to be performed at a relatively high speed and it is found that a single video camera may be able to control a plurality of harvesting heads all operating simultaneously over different parts of the same growing area.

According to a further aspect of the present invention, there is provided apparatus for harvesting items of produce, which apparatus comprises means to support a growing area (such as a mushroom tray) for items of the produce, and a video camera arranged to scan that growing area and to produce an image thereof. A harvesting head including a suction gripper for holding an item of produce is arranged to be movable towards and away from the growing area, means being provided to rotate the gripper as &he gripper is moved away from the growing area simultaneously to twist and pull the item from the growing medium. Control means are arranged to analyse the image produced by the video camera and to control the operation of the harvesting head including the positioning thereof over the growing area and the rotation of the gripper, dependent upon the results of the analysis of the image.

BRIEF DESCRIPTION OF THE DRAWINGS

In order that the invention may better be understood, it will now be described in greater detail and a specific embodiment thereof given, reference being made to the accompanying drawings, as appropriate. In the drawings.

DESCRIPTION OF THE PREFERRED EMBODIMENT

Figure 1:
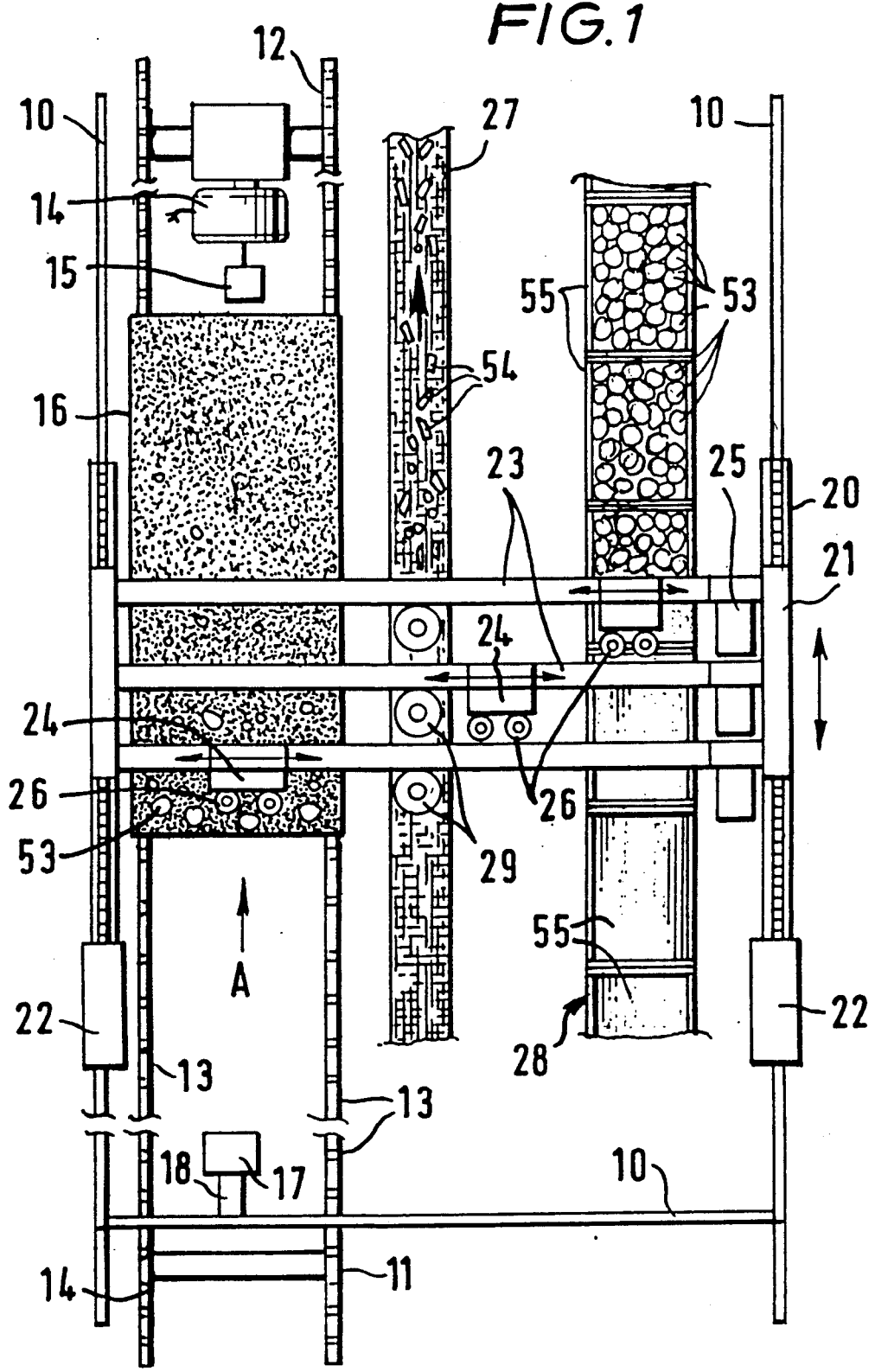
FIG. 1 is a diagrammatic plan view of the embodiment of automatic mushroom picking apparatus of this invention.

Though the method and apparatus of this invention are applicable to the harvesting of various kinds of produce, nevertheless they are particularly suitable for the harvesting of mushrooms and the invention will further be described hereinafter primarily with reference to mushroom harvesting.

In the case of the harvesting of mushrooms, it is essential that the stalk is broken away from the mycelium without greatly disturbing the mycelium or the layer of growing medium in which the mycelium lies. This is achieved by twisting the mushroom either simultaneously as it is lifted away from the growing medium, or shortly before any significant lifting takes place.

It is highly preferred to use a line-scan camera which performs a plurality of scanning operations on the growing area to build up the image one line (of the image) at a time; in this way a complete image is built up gradually and can be analysed as the scanning takes place. Depending upon the analysing program, it may not be necessary at any one time to have a complete image of the growing area; it could be sufficient for no more than an image of a narrow band to be stored for analysis at any instant. Each time an item of produce is determined to be suitable for harvesting, the centre co-ordinates of that item may be assessed, and then stored for subsequent recall to control the harvesting head.

Though the scanning could be performed by moving the camera over the growing area, it is preferred for that area to be defined by a tray including a growing medium for the produce, and for the scanning then to be performed by moving the tray past the field of view of the camera. Advantageously, the tray is mounted on a suitable conveyor which is then driven to carry the tray through the field of view of the camera and towards a position where the harvesting head operates. In this case, it is preferred for the harvesting head to be mounted for movement in a direction transverse to the direction of movement of the tray, and for the alignment of the line of action of the head and the co-ordinates of an item to be harvested to be achieved by the combined movement of the tray in one direction and the head in a direction substantially at right angles thereto. In addition, the harvesting head may be movable forwards and backwards in a direction parallel to the direction of advancement of the tray.

Most preferably, the support means of the apparatus comprises a conveyer on which may be carried a tray including the growing medium and defining the growing area, whereby the tray may be moved through the field of view of the camera. The speed of movement of the conveyer may be variable, to facilitate positioning of the harvesting head.

In a simple arrangement of this invention, the harvesting head may be mounted on a guide extending transversely to the direction of advancement of the tray, drive means being arranged to effect movement of the head along the length of the guide. By the combined movement of a supported tray and of the head on the guide, the line of action of the head may be located to pass through any point on the tray.

In a preferred embodiment, the guide forms a part of a carriage which is arranged for forward and backwards movement in a direction parallel to that of the conveyer, to facilitate positioning of the harvesting head thereby to optimise the picking rate. Moreover, the carriage may support more than one harvesting head; a plurality of heads may be provided, each separately movable transversely of the tray, or movable in pairs or in other groupings transversely of the tray. All of the heads may however be controlled by the analysis of an image derived from a single video camera.

The control means may include a processing unit operating in accordance with a predetermined program, and a memory in which the co-ordinates of each item of produce to be harvested are stored. The determined co-ordinates are then used to control the positioning of the or each harvesting head, with one co-ordinate corresponding to the movement of the support and the other to the position of a head on its guide.

Each harvesting head may include a pneumatic ram, the gripper for the produce being mounted on one part of that ram and the other part being mounted on a suitable sub-frame associated with the guide. Advantageously the whole ram is mounted on the sub-frame for rotational movement, so that the twisting action may be imparted to the gripper by turning the ram, as a whole. A further ram may be provided for this purpose, appropriately coupled to the first-mentioned ram.

The gripper for holding items of produce must be capable of securely holding an item without significantly bruising or otherwise damaging that item. To that end, the gripper may be in the form of a cylindrical impervious bellows containing a porous block through which air is drawn, the bellows having at its free end a resilient contact face adapted to contact and effect a seal against the item. The contact face may be defined by a replaceable resilient washer adhered to the bellows.

Referenced will now be made to the accompanying drawings showing one specific embodiment of apparatus of this invention, constructed and arranged to perform a method also according to the invention.

Referring to the drawings, it can be seen that the apparatus comprises a main frame 10 supporting a tray conveyer having two pairs of sprockets 11 and 12 around which extend two endless conveyer chains 13, a variable speed motor 14 being coupled to one pair of sprockets 11 to effect driving of the chains An encoder 15 is connected to the motor shaft to give an indication of the conveyer advancement. The conveyer chains 13 are arranged to support conventional mushroom-growing trays one of which is shown at 16, to advance the trays in direction 'A'.

A line-scan camera 17 is mounted above the frame 10 on a bracket 18, so as to produce a line image of that part of a tray of mushrooms for the time being below the camera. Operation of the conveyer advances a tray along the length of the frame, so allowing a complete image of the tray to be built up. The camera line-image output signal may be analysed by an on-board processor in the camera, or by a separate computer control unit 19 including a monitor and keyboard. The analysis is performed by a predefined program to yield the co-ordinates of mushrooms in the tray which are of a size suitable for harvesting, the co-ordinates then being stored in the control unit 19, which also receives the output from the encoder 15 and controls the operation of the motor 14.

A pair of rails 20 are mounted above the main frame 10, the rails supporting a carriage 21 arranged for sliding movement parallel to the direction 'A' under the action of two screw actuators 22 controlled by the control unit 19. The carriage has three cross-members 23 on each of which is mounted a slide 24, each slide being movable along the length of its associated cross-member by means of a respective actuator 25. Each slide 24 supports two individual and separately-operable mushroom picking heads 26. The carriage 21 spans the tray conveyer and also a parallel-running stalk conveyer 27 and a parallel-running box conveyer 28, and each cross-member supports a stalk-cutter 29 at a fixed position over the stalk conveyer 27. The picking heads 26, actuators 25 and stalk cutters 29 are all controlled by the control unit 19.

The frame 10 further supports a pneumatic controller (not shown) including a low-pressure source and connected to the picking heads 26, the operation of which controller is in turn controlled by the control unit 19.

Figure 3:
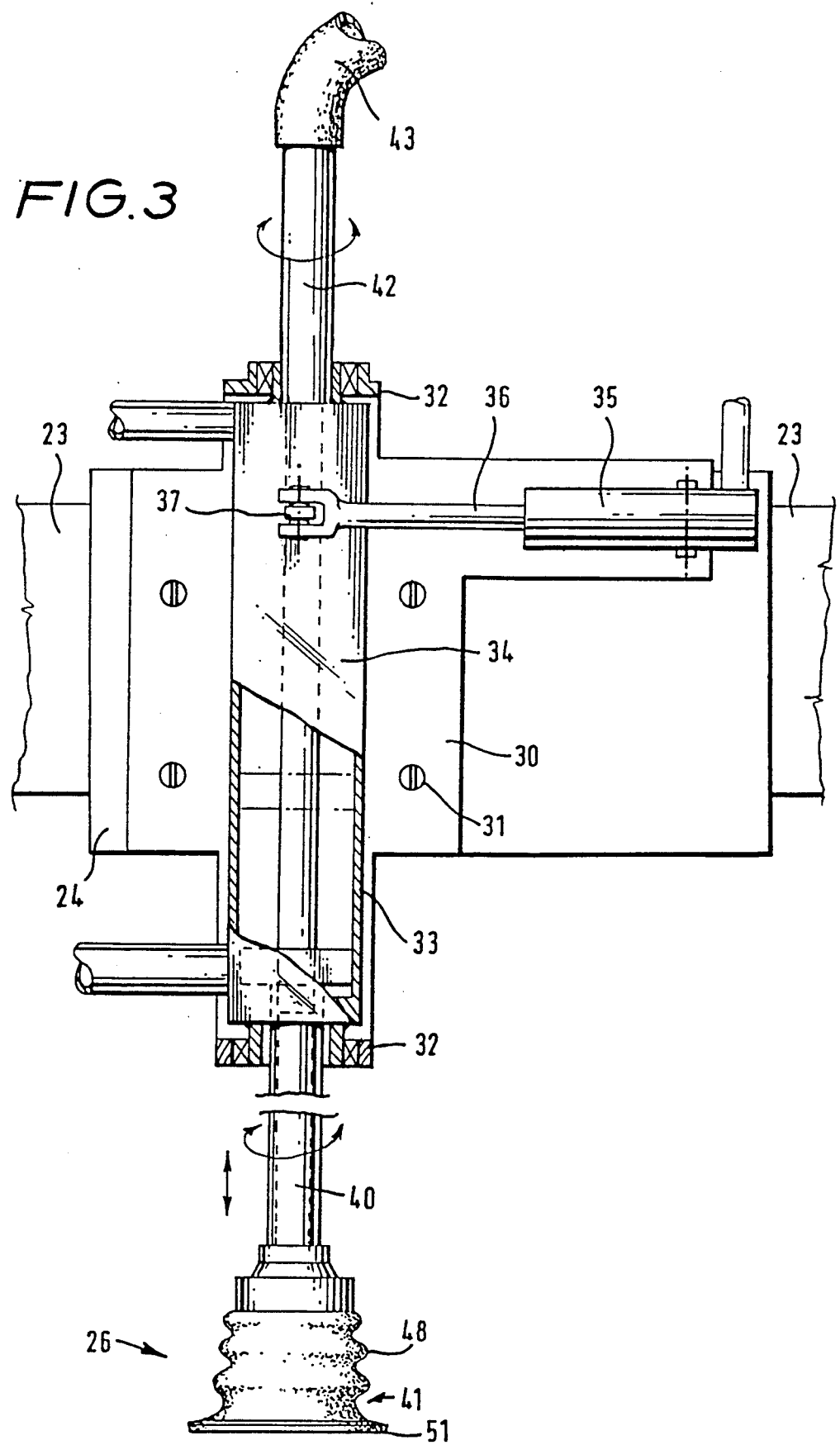
FIG. 3 is an end view on the picking head used in the apparatus of FIGS. 1 and 2.
Figure 4:
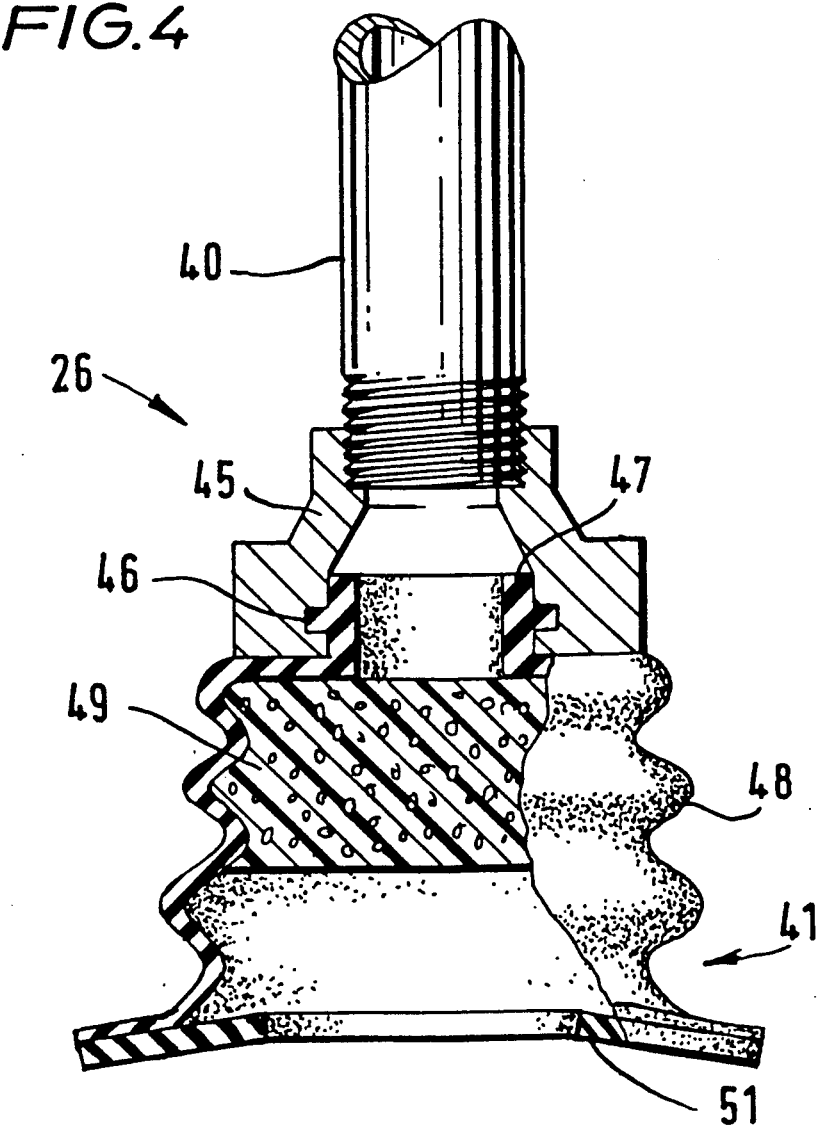
FIG. 4 is an enlarged view on a mushroom gripper forming a part of the picking head of FIG. 3.

Referring now to FIGS. 3 and 4, each picking head 26 is illustrated in greater detail. The picking head includes a mounting plate 30 secured to the slide 24 by means of bolts 31, there being an opposed pair of right-angle brackets 32 attached to the plate 30, and between which is mounted the cylinder 33 of a pneumatic ram 34, for rotational movement about the ram axis. A second pneumatic ram 35 is pivoted to the plate 30, and the free end of the ram piston rod 36 is pivoted to an arm 37 projecting radially from the cylinder 33. Operation of the ram 35 will thus rotate the cylinder 33.

The piston rod 40 of the cylinder 33 is non-rotatably disposed with respect to that cylinder and has a mushroom gripper 41 mounted at its free end. The rod 40 is hollow and allows communication between the gripper 41 and a suction pipe 42 coupled to the pneumatic controller by means of a flexible pipe 43. Further pneumatic control pipes from the pneumatic controller are provided as required to allow raising and lowering of the piston rod 40, and operation of the second ram 35.

The gripper 41 comprises a boss 45 screw-threaded on to the free end of the rod 40, the boss 45 having an internal annular groove 46 in which is located a bead formed around a neck 47 of a cylindrical flexible bellows 48, a block 49 of relatively soft, resilient open-cell foamed plastics material being positioned within the bellows, against the end face of the boss 45, to act as an air filter. The free end of the bellows has adhered thereto a replaceable washer 51 of a soft resilient material for contacting a mushroom to be harvested and effecting a seal thereagainst.

Figure 2:
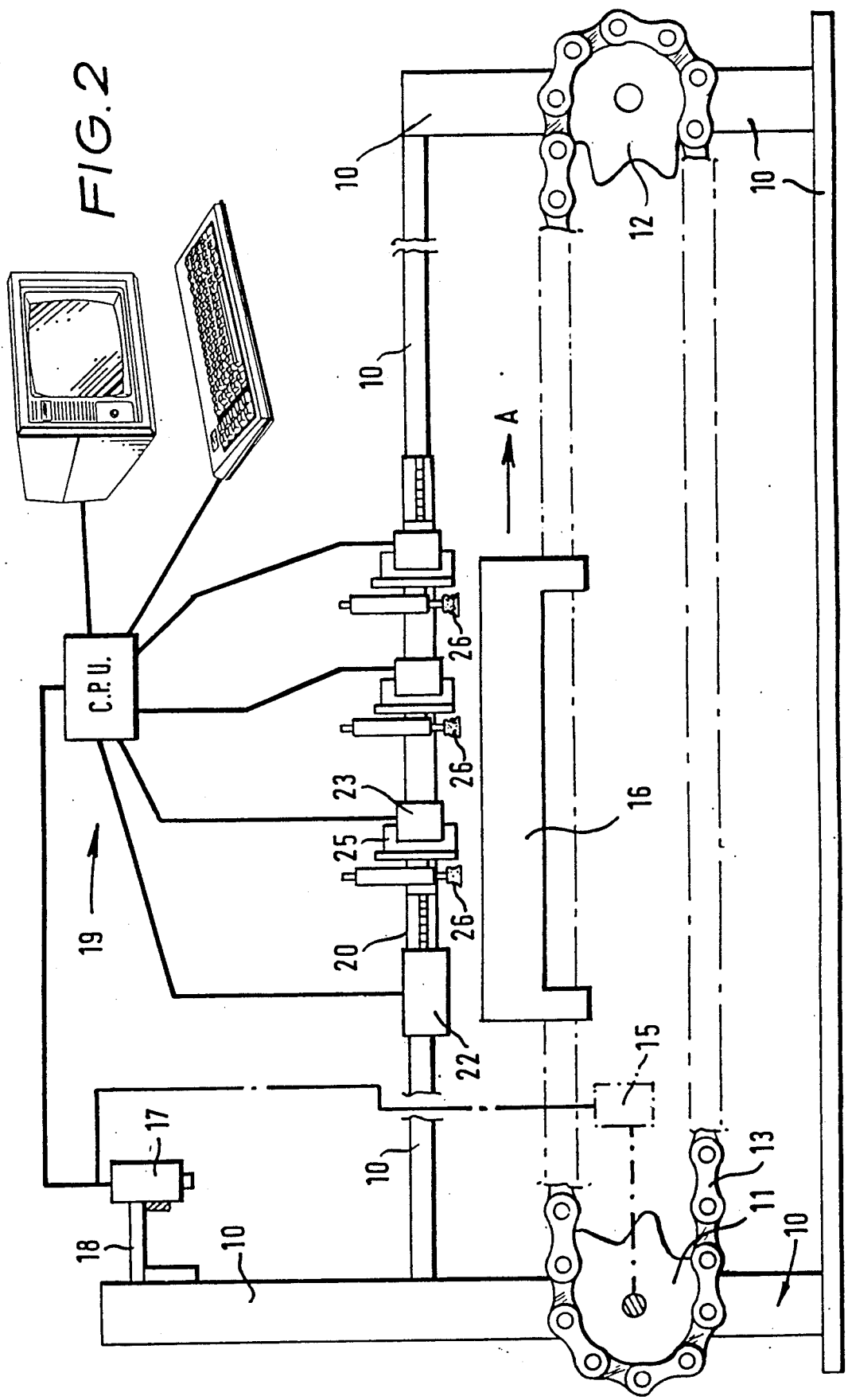
FIG. 2 is a diagrammatic side view of the apparatus of FIG. 1.

The apparatus described above operates in the following manner. The motor 14 is operated to drive the tray conveyer in direction 'A', and a tray 16 of mushrooms 53 to be harvested is fed on to the conveyer, to be advanced slowly to the right (FIG. 2) so as to pass below the field of view of the camera 17.

An image of the tray is built up from a combination of the outputs from the encoder 15 and the camera 17, scanning the tray by one line at a time. As this image is being produced and analysed by the camera on-board processor or by the control unit 19, it is stored in a memory in the control unit, operating in accordance with a predetermined program. The analysis observes the contrast between a mushroom cap (more or less white) with the growing medium (more or less black), and an assessment of the diameter of each cap on the bed can be made. If a mushroom suitable for harvesting is found, because its size falls within a preset range, then a further analysis is performed to find the approximate geometric centre thereof, and the co-ordinates of that centre relative to a datum (for instance, a corner of the tray) are stored in memory.

Further advancing of the tray brings it to beneath the carriage 21; as soon as a mushroom ready for harvesting is under the line of movement of a slide 24, the appropriate actuator 25 is controlled to bring the line of action of a picking head 26 on that slide into alignment with the centre of the mushroom. It will here be appreciated that the advancement of the tray corresponds to one stored co-ordinate of a mushroom and the transverse movement of the head corresponds to the other stored co-ordinate. Then, the pneumatic controller is operated by the control unit 19 to cause the piston rod 40 of the ram 34 to be lowed until the washer 51 of the bellows 48 contacts the upper surface of the cap of the mushroom to be picked. At the same time, the low-pressure source applies suction to pipe 42, and so also to the hollow piston rod 40, to draw air through the foam block 49. The contact of the washer 51 of the bellows 48 with the upper surface of the mushroom cap effects at least a partial air-seal which serves to draw the bellows 48 into close engagement with the mushroom cap, but the resilient washer 51 cushions the mushroom so as to prevent any significant bruising or other damage. As the gripping action is perfected, there is a consequent change in pressure within the rod 40, and this is detected by the pneumatic controller. The movement of the rod 40 is then reversed and at the same time, the ram 34 is operated to twist the cylinder 33. Thus, a mushroom held against the washer 51 is both twisted and lifted away from the supported tray.

Immediately thereafter, the slide 24 is moved laterally to overlie the stalk conveyer 27, and the associated stalk cutter 29 is operated to remove the lower portion of the stalk of the held mushroom. The stalk cutter 29 may operate with a scissor-like cutting action, or may utilise rotary cutting discs, in a manner understood in the art, so that the cut stalk 54 falls away on to the stalk conveyer 27. The held mushroom is then moved laterally further, so as to overlie the box conveyer 28. There, the mushroom is deposited within a box 55 on that conveyer, by allowing the pressure within the rod 40 to increase and, if appropriate, lowering the gripper at the same time. The slide 24 is then moved back to overlie the tray of mushrooms, to harvest another mushroom using co-ordinate data stored by the control unit 19.

If there are many mushrooms to be harvested, the three slides 24 may operate simultaneously, the two picking heads on each slide being used sequentially. Productivity is increased by driving the carriage by actuators 22, to minimise 'wait-time' for a mushroom to be in a position where it may be harvested by a picking head. The software controlling the operation should optimise the sharing of the picking between all six heads and the operation of the carriage 21 to enhance productivity.

In the embodiment of apparatus described above, a mushroom is harvested by a twisting and pulling action which to some extent simulates a manual harvesting operation, and yet the mushroom is held only by the upper surface of the cap. However, the cushioning effect of the bellows 48 and washer 51 in association with the low-pressure gripping technique allows the mushroom to be harvested without significant bruising or other damage. The apparatus may however operate at relatively high speeds, with the picking rate enhanced by providing more than one picking head on each of three slides. By enabling very high picking rates in this way, the apparatus becomes most viable, commercially.

I claim:

1. A method of harvesting produce using a video camera to scan a growing area for the produce to yield an image of that area and controlling a harvesting head on the basis of an analysis of the image, comprising:
   (a) analysing the image to determine the co-ordinates relative to a pre-set datum of each item of produce assessed to be suitable for harvesting on the basis of a characteristic analysed from said image;
   (b) controlling a harvesting head including a suction gripper for holding an item of produce so as to be positioned over the growing area with its line of action intersecting the co-ordinates of an item of produce selected for harvesting;
   (c) moving the gripper towards the item until the gripper makes contact with and holds by suction the item of produce;
   (d) twisting the gripper whilst maintaining the hold of the gripper on the item, and substantially simultaneously moving the gripper away from the engagement position, so as to pick said item from the growing site;
   (e) moving the harvesting head to a discharge position; and
   (f) releasing the item by removing the suction from the gripper.

2. A method according to claim in which a plurality of harvesting heads is controlled by the output of a single video camera, the harvesting heads operating simultaneously over different parts of the same growing area.

3. A method according to claim 1, in which the centre co-ordinates of an item determined to be suitable for harvesting are assessed and stored for subsequent recall to control the harvesting head.

4. A method according claim 1, in which the scanned area is defined by a tray including a growing medium for the produce, the scanning being performed by moving the tray past the field of view of the camera, and subsequently past the position where the harvesting head operates.

5. A method according to claim 4, in which the harvesting head is movable in a direction transverse to the direction of movement of the tray, whereby the alignment of the line of action of the head and the co-ordinates of a item to be harvested are achieved by the combined movement of the tray in one direction and the movement of the head in a direction substantially at right-angles thereto.

6. A method according to claim 5, in which the harvesting head is movable forwards and backwards in a direction parallel to the direction of advancement of the tray.

7. Apparatus for harvesting items of produce, comprising:
   (a) means to support a growing area for items of produce;
   (b) a video camera arranged to scan the growing area for items of the produce;
   (c) a harvesting head including a suction gripper for holding an item of produce which gripper is movable towards and away from the growing area;
   (d) means to rotate the gripper as the gripper is moved away from the growing area; and
   (e) control means arranged to analyse the image produced by the video camera and to control the operation of the harvesting head including the positioning thereof over the growing area and the rotation of the gripper, dependent upon the results of the analysis of the image.

8. Apparatus according to claim 7, wherein the support means comprises a conveyer on which may be carried a tray including the growing medium and defining the growing area, variable speed drive means being provided for the conveyer.

9. Apparatus according to claim 7, in which the harvesting head is mounted on a guide extending transversely of the direction of advancement of the tray, drive means being arranged to effect movement of the head along the length of the guide.

10. Apparatus according to claim 9, in which the guide comprises a part of a carriage which is arranged for forward and backward movement in a direction parallel to the direction of movement of the conveyer.

11. Apparatus according to claim 7, in which a plurality of heads are provided arranged in groups with at least one head in each group, each group being separately movable transversely of the conveyer.

12. Apparatus according to claim 7, in which the harvesting head includes a pneumatic ram, the gripper for the produce being mounted on one part of said ram and the other part of the ram being mounted on a subframe.

13. Apparatus according to claim 12, in which said ram is mounted on said sub-frame for rotational movement, whereby the twisting action of the gripper is imparted to the gripper by turning said ram as a whole.

14. Apparatus according to claim 7, in which the gripper for holding items of produce comprises a cylindrical impervious bellows having at its free end a resilient contact face adapted to contact and effect a seal against the item.

* * * * *

UNITED STATES PATENT AND TRADEMARK OFFICE
CERTIFICATE OF CORRECTION

PATENT NO. : 5,058,368

DATED : Oct. 22, 1991

INVENTOR(S) : Geoffrey C. Wheeler

It is certified that error appears in the above-identified patent and that said Letters Patent is hereby corrected as shown below:

On the title page, insert the following:

--[73] Priorlucky Limited, Norfolk, England--.

Signed and Sealed this

Fifth Day of January, 1993

Attest:

DOUGLAS B. COMER

Attesting Officer

Acting Commissioner of Patents and Trademarks